United States Patent
Wilde

(10) Patent No.: US 9,489,577 B2
(45) Date of Patent: Nov. 8, 2016

(54) VISUAL SIMILARITY FOR VIDEO CONTENT

(75) Inventor: Thomas Wilde, Wellesley, MA (US)

(73) Assignee: CXENSE ASA, Oslo (NO)

( * ) Notice: Subject to any disclaimer, the term of this patent is extended or adjusted under 35 U.S.C. 154(b) by 1747 days.

(21) Appl. No.: 12/804,518

(22) Filed: Jul. 23, 2010

(65) Prior Publication Data

US 2011/0022394 A1 Jan. 27, 2011

Related U.S. Application Data

(60) Provisional application No. 61/271,848, filed on Jul. 27, 2009.

(51) Int. Cl.
*G10L 15/26* (2006.01)
*G06K 9/00* (2006.01)

(52) U.S. Cl.
CPC .......... *G06K 9/00718* (2013.01); *G10L 15/26* (2013.01)

(58) Field of Classification Search
CPC .......................... G06K 9/00718; G10L 15/26
USPC ....... 704/270, 251, 278, 235; 725/40, 45, 46
See application file for complete search history.

(56) References Cited

U.S. PATENT DOCUMENTS

| | | | | |
|---|---|---|---|---|
| 5,136,655 A | * | 8/1992 | Bronson | 704/270 |
| 5,794,249 A | * | 8/1998 | Orsolini et al. | 704/200 |
| 6,243,713 B1 | * | 6/2001 | Nelson et al. | |
| 6,377,995 B2 | * | 4/2002 | Agraharam et al. | 709/231 |
| 6,611,803 B1 | * | 8/2003 | Furuyama et al. | 704/254 |
| 6,877,134 B1 | * | 4/2005 | Fuller et al. | 715/202 |
| 2002/0069073 A1 | * | 6/2002 | Fasciano | 704/278 |
| 2005/0203750 A1 | * | 9/2005 | Miyamoto et al. | 704/276 |
| 2005/0216443 A1 | * | 9/2005 | Morton et al. | 707/3 |
| 2006/0264209 A1 | * | 11/2006 | Atkinson et al. | 455/422.1 |
| 2007/0112837 A1 | * | 5/2007 | Houh et al. | 707/102 |
| 2007/0288237 A1 | * | 12/2007 | Wu et al. | 704/235 |
| 2009/0150947 A1 | * | 6/2009 | Soderstrom | 725/93 |

OTHER PUBLICATIONS

Dimitrova et al. "Applications of Video-Content Analysis and Retrieval", IEEE, Multimedia, 2002.*

* cited by examiner

*Primary Examiner* — Jialong He
(74) *Attorney, Agent, or Firm* — Tarter Krinsky & Drogin LLP

(57) ABSTRACT

Methods and apparatus, including computer program products, for visual similarity. A method includes receiving a stream of video content, generating interpretations of the received video content using speech/natural language processing (NLP), associating the interpretations of the received video content with images extracted from video content based on timeline, and using the interpretations to obtain interpretations of other images or other video content.

19 Claims, 4 Drawing Sheets

Eight (8) seconds of sample audio text before any processing:

300

*President Wright Obama and Vice President Dick Cheney squared off in contentious, back-to-back addresses over the Bush era's terrorism policies. Mr. Obama declared that the nation had gone "off course."*

Eight (8) seconds of the sample audio text after processing:

| Text: | *President Barack Obama and Vice President Dick Cheney* | | |
|---|---|---|---|
| NLP1: | [Barack Obama, type=person] | | [Dick Cheney |
| NLP2: | [(Summary passage | | |
| Time: | 0:00 | 0:01 | 0:02 |

---

Text: *Dick Cheney squared off in contentious,*
NLP1:     type=person]
NLP2:
Time:     0:03

---

Text: *back-to-back addresses over the Bush*
NLP1:                              [GeorgeW.Bush, type=person]
NLP2:
Time: 0:04                         0:05

---

Text: *era's terrorism policies. Mr. Obama declared*
NLP1:          [terrorism, type=concept]
NLP2:
Time:          0:06

---

Text: *that the nation had gone gone "off course."*
NLP1:
NLP2:
Time: 0:07

FIG. 3

VISUAL SIMILARITY FOR VIDEO CONTENT

CROSS-REFERENCE TO RELATED APPLICATIONS

This application claims the benefit of U.S. Provisional Application No. 61/271,848, filed Jul. 27, 2010, and titled VISUAL SIMILARITY, which is incorporated by reference in its entirety.

BACKGROUND OF THE INVENTION

The present invention relates to data processing by digital computer, and more particularly to visual similarity.

Media content is being created and archived at a rapid pace. Media content can generally refer to a time synchronized ensemble of audio content and/or visual (text, images, graphics, video, and so forth) content that is captured from a presentation, lecture, speech, debate, television broadcast, board meeting, video, and so forth.

It is difficult to automatically identify a digital video clip in a video (i.e., digital video file) using image representations within the file alone. Even if videos could be compared to one another using pixel representations of the file, the file's aboutness would not be known because there is an absence of granular meta data inside the file. Here "aboutness" generally refers to one among other terms used to express certain attributes of the file, its content, subject or topic, and so forth. Aboutness (or synonymous terms) is important for knowledge organization and information retrieval.

SUMMARY OF THE INVENTION

The present invention provides methods and apparatus, including computer program products, for visual similarity.

In general, in one aspect, the invention features a method including receiving a stream of video content, generating interpretations of the received video content using speech/natural language processing (NLP), associating the interpretations of the received video content with images extracted from video content based on timeline, and using the stored interpretations to obtain interpretations of other images or other video content.

In another aspect, the invention features a method including receiving a stream of video content, generating speech to text for the received video content, generating passage level annotations from generated text using natural language processing (NLP), associating the passage level annotations with the text from the speech time aligned to result in text, annotations and a time stamp, and associating imagery with the annotated text to generate thumbnails at periodic time intervals resulting in a database of annotations to imagery and imagery to annotations.

In another aspect, the invention features an apparatus including a local computing system linked to a network of interconnected computer systems, the local computing system comprising a processor 18, a memory and a storage device, the memory comprising an operating system and a visual similarity process, the visual similarity process including receiving a stream of video content, generating speech to text for the received video content, generating passage level annotations from generated text using natural language processing (NLP), associating the passage level annotations with the text from the speech time aligned to result in text, annotations and a time stamp, and associating imagery with the annotated text to generate thumbnails at periodic time intervals resulting in a database of annotations to imagery and imagery to annotations.

Other features and advantages of the invention are apparent from the following description, and from the claims.

BRIEF DESCRIPTION OF THE DRAWINGS

The invention will be more fully understood by reference to the detailed description, in conjunction with the following figures, wherein:

FIG. 3 is an exemplary video scan.

Like reference numbers and designations in the various drawings indicate like elements.

DETAILED DESCRIPTION

Figure 1:
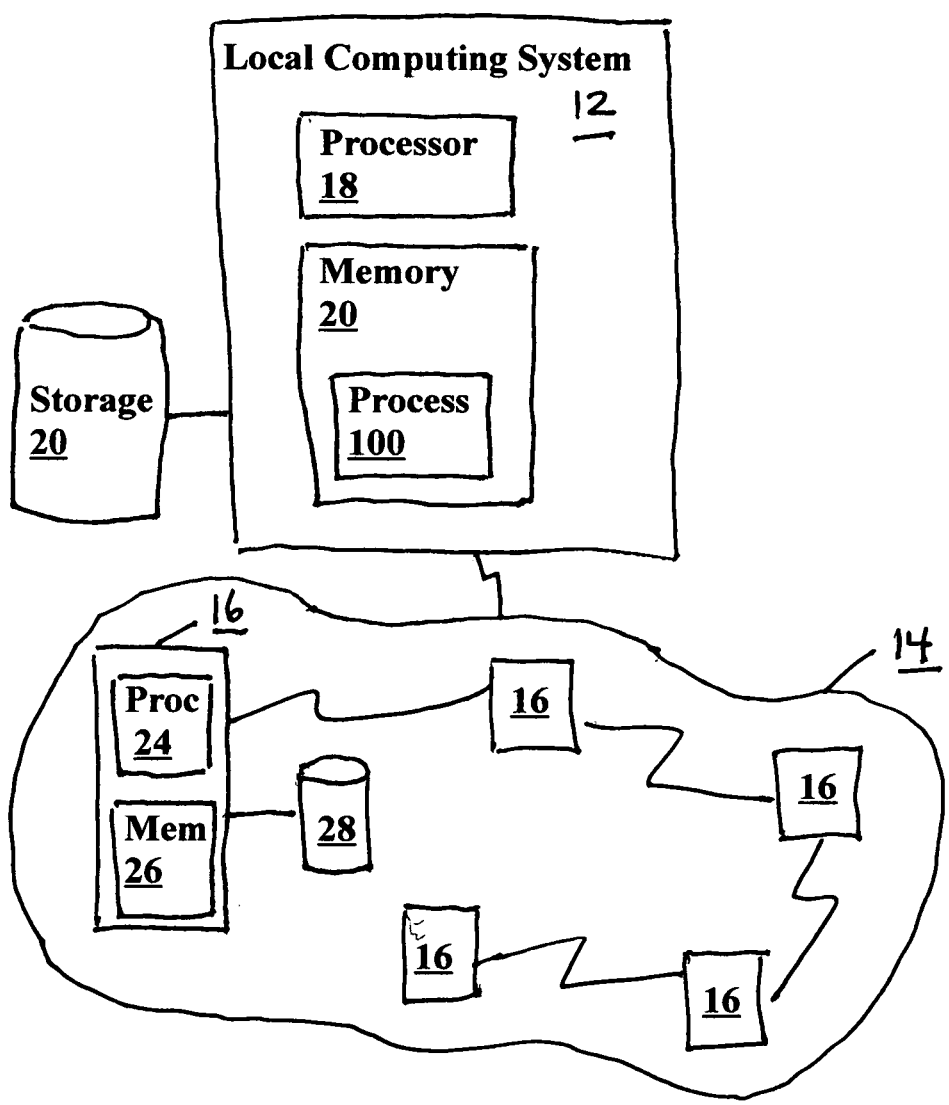
FIG. 1 is a block diagram.

As shown in FIG. 1, a system 10 includes a local computing system 12 linked to a network 14 of interconnected computer systems 16, such as servers in a private or public network. The local computing system 12 includes a processor 18, memory 20 and storage device 22. Each of the interconnected computer systems 16 includes a processor 24, memory 26 and storage device 28. A visual similarity process 100 may reside locally in the computing system memory 20 or in a resource's memory 26, such as a server, residing in the private or public network 14 (e.g., the Internet).

Figure 2:
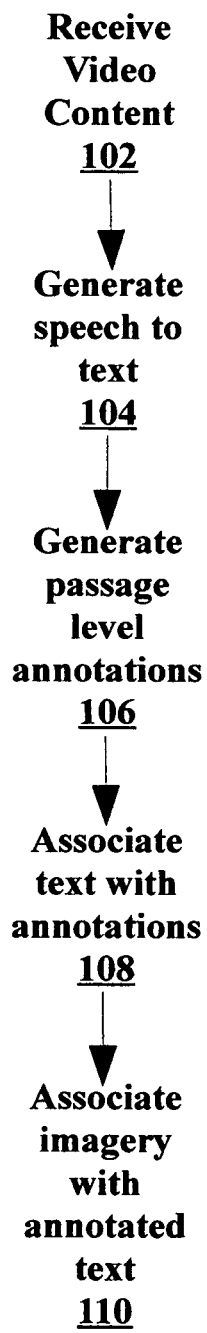
FIG. 2 is a flow diagram.

Referring to FIG. 2, the visual similarity process 100 includes receiving (102) video content. Speech to text is generated (104) for the video content.

The visual similarity process 100 uses natural language processing (NLP) to generate (106) passage level annotations from the text. These annotations can include, for example, names, concepts, logical substructure (e.g., topic changes), and so forth. These annotations are associated (108) with the text from the speech and time aligned to result in text, annotations and a time stamp or time line.

As shown in FIG. 3, annotation of a sample eight (8) second video passage 300 is illustrated. In the first two (2) seconds, NLP annotates "Barack Obama" as type equal to person, which is time stamped at 0:01 seconds, and "Dick Cheney" as type equal to person, which is time stamped at 0:02 seconds. At time equal to five (5) seconds, NLP annotates "Bush" as George W. Bush, type equal to person. Between five (5) and six (6) seconds, NLP annotates "terrorism" as type equal to concept.

The visual similarity process 100 associates (110) imagery with the annotated text to generate thumbnails at periodic time intervals resulting in a database of annotations to imagery and imagery to annotations. Machine learning techniques can be applied to represent the mapping between annotations and imagery. For example, a neural networks approach or a classification and regression tree (CART) approach can be used to either classify an image into an annotation (or a set of possible annotations) or conversely, to classify an annotation into an image (or a set of possible images). Use of image analysis techniques such as principal component analysis (PCA) of facial imagery, models of color and/or shape distributions, can also be employed as part of a mapping representation process. The image analysis techniques are useful because one may have, for example, a thousand different images of a dog and need to more compactly represent the image similarity aspects of a dog.

These same techniques can be used to cluster the images, e.g., into big dogs and small dogs, so one can then trade off representing dogs as two groupings, big and small, or as one, depending on which is determined to work better. There are also techniques for determining "which is determined to work better," e.g., very simply, it can be based on similarity within each grouping or one can test the resulting groupings against a set of "held out" images.

Because the text transcript and the annotations are time stamped, each thumbnail includes the closest passage from the text as well as the best concept(s) from the passage. For a specific video, this meta data represents the "tags" for each thumbnail.

Thumbnails can occur over any interval of time, such as every four (4) seconds, reducing the number of images that need to be processed by a factor of one hundred twenty (120) for a video shot at thirty frames per second (30 FPS), thus dramatically reducing required computing power.

A result is a mapping between images and annotations. Process 100 can generate a master catalog of images for various annotations. New video/images come in, with or without speech. NLP processing can also be applied to video without speech.

When speech is not available, or as an additional source of information, process 100 can take image thumbnails from new videos, look up similar images in a master catalog and show which annotations are associated in the master catalog to the similar images. The derivation of similar images can be on a pixel comparison basis, or using image analysis techniques such as PCA, color/shape models, and so forth.

Instead of a direct look-up in the master catalog, if machine learning is used to train classifiers, one can apply those classifiers directly to the new image. For example, if one had trained a classifier for "Barack Obama" or for "Tim Geithner" and so forth, one can apply all those classifiers to a new thumbnail and see which fires to generate an annotation.

Once a store of videos has been processed, the video similarity process 100 can be used to perform comparisons of videos whether the videos contain speech or not, e.g., still pictures. More specifically, image matching, image searching and video searching are enabled. For example, two videos are compared using pixel comparison, i.e., every thumbnail generated is compared to every thumbnail in the total index using a hash table. Visually similar thumbnails are collected. Similarity strength is configurable. The "tags" from the thumbnails are processed using natural language processing. The natural language processing statistically derives what is likely to be the "best" tags to describe the thumbnail.

A set of the thumbnails is moved into a "master" catalog and represents the visual "dictionary" for the image in question. For example, thousands of thumbnails that have an image of Barack Obama can be "tagged" Barack Obama to the point where the natural language processing assigns the tag "Barack Obama" to the pixel representation of Barack Obama. In this fashion, the visual similarity process 100 "learns" what Barack Obama "looks" like.

In implementations, the visual similarity process 100 can be fine-tuned and used to analyze different matches of images within a specified time frame or among different video samples. The visual similarity process 100 can be used to detect scene changes within videos or be combined with databases containing personal recognition information.

Annotations can be associated with confidence scores. Confidence scores for annotations from NLP of speech recognition can take into consideration the speech recongizer's confidence score computed from acoustic and linguistic models. Confidence scores can also take into consideration the closeness of a match between the text and a known concept/entity. For example, for the entity "Barack Obama," if the text is "Barack Obama," it is a stronger match than just "Obama." Confidence scores can also use synonym relationships in the NLP models, e.g., "President Obama" is also a strong match for "Barack Obama" because one is likely to have them defined as synonyms, though from a pure text perspective, there is only one word, i.e., "Obama," match. One can also use contextual information, i.e., what the rest of the text is about.

Confidence scores can also take into consideration confusability of the concept/entity. For example, because there are two George Bushes, "Bush" would not be a highly confident match. However, if one takes date into consideration or context, the younger Bush would get a higher score for more current text.

Close captioning information can be analyzed, e.g., forced audio text alignment. More specifically, closed captioning provides rough alignments of text to speech/audio/video. But one can treat the closed captioning text as the true transcript, and even use the approximate alignments (perhaps with a +/−5 second window) as anchors, and then use speech recognition to get a more precise alignment. The speech recognition in this case is a much higher accuracy because it knows the "true" transcript and it also limits the recognition to the approximate alignments (e.g., a +/−5 second window for beginning/end of a closed captioned sentence). One can get "cleaner" text (no mis-recognitions) against which to run the NLP.

The visual similarity process 100 can be used to detect key frames, e.g., highlight frames. There are various key frame identification methods available, the simplest of which detects a scene change, i.e. the next frame is dramatically different from the previous frame. For example, this can use color/shape models, pixel by pixel comparisons, and so forth.

As future thumbnails are received, they may be compared to a master index for tagging. When images received cannot be tagged, the received images are set aside for clustering using the visual similarity process 100 to attempt to "learn" what the received images are and move them into the master index.

In one particular implementation, to "jump start" the visual similarity process 100, the visual similarity process 100 indexes thousands of still images from across a network such as the World Wide Web ("the web"), where high quality tags are present, such as Flickr®, an image and video hosting website. Over time, a database can include a large master index of high quality images and tags that are used as a standard for auto-tagging new content at the thumbnail level.

The invention can be implemented to realize one or more of the following advantages.

A visual similarity process 100 utilizes a speech to text process to tag videos, constructing their aboutness using timestamped text. The visual similarity process 100 generates thumbnails of the video at frequent intervals. The visual similarity process 100 uses natural language processing (NLP) to distill a passage down to its core concepts, or concepts, as well as compare passages to detect similarities.

A visual similarity process 100 can be used to find similar videos across a corpus using a similarity vector approach.

A visual similarity process 100 can be used to find identical copies of a given video where the video may have been excerpted prior to posting.

A visual similarity process 100 can be used as a "jumpto" function, enabling users to freeze a video and request videos that match the displayed frame. For example, if a user is is watching a video, stops at an image of Barack Obama, and desires to see other videos about Barack Obama at the place in the video that's about Barack Obama. If one does an annotation search, one can find other images about Barack Obama even without a direct image match.

Figure 4:
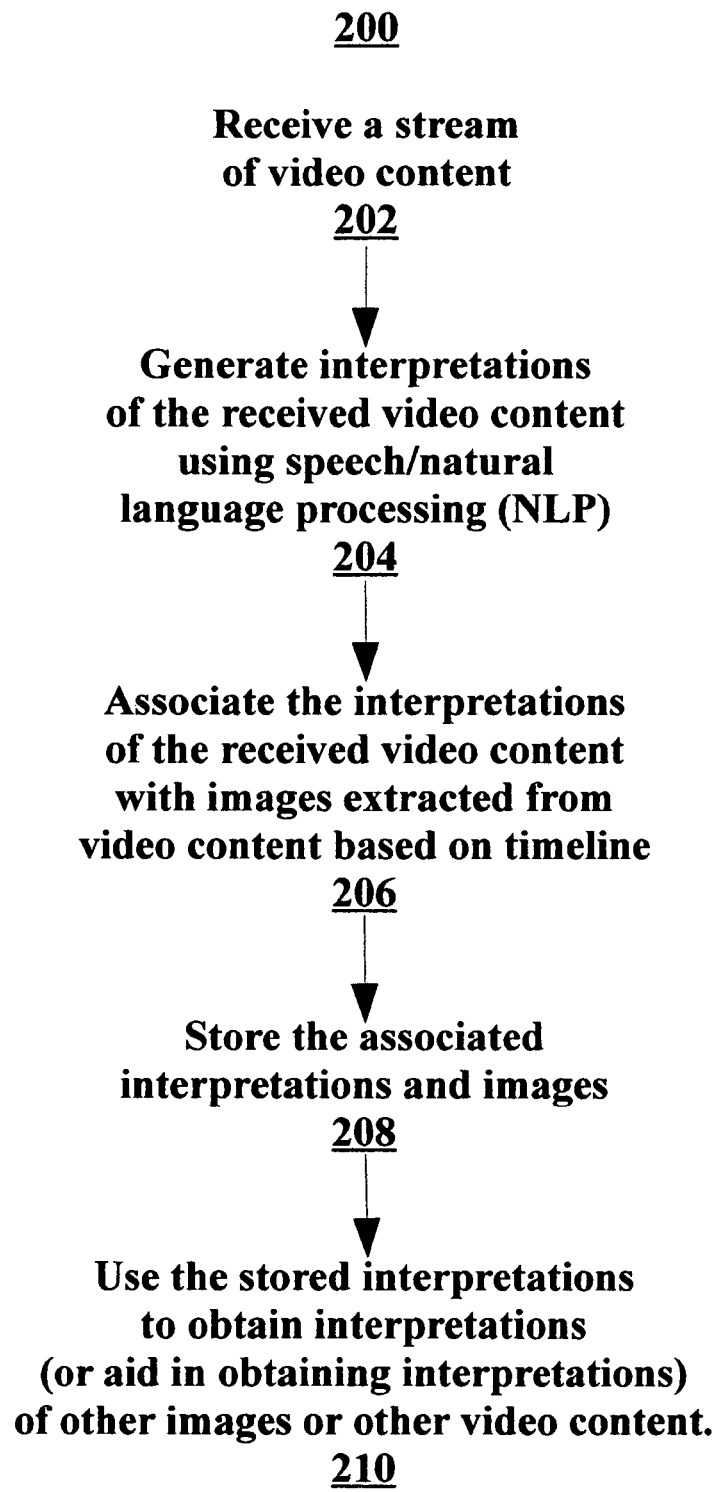
FIG. 4 is a flow diagram.

As shown in FIG. 4, a process 200 includes receiving (202) a stream of video content and generating (204) interpretations of the received video content using speech/natural language processing (NLP). Generating (204) interpretations may include key frames in scene transitions and/or clustering images. NLP may be used in conjunction with closed captions and/or passages. NLP may be used in conjunction with closed captions and/or passages.

Process 200 associates (206) the interpretations of the received video content with images extracted from video content based on timeline and stores (208) the associated interpretations and images. The associated interpretations and images can be stored in a database.

Process 200 uses (210) the stored interpretations to obtain interpretations (or aid in obtaining interpretations) of other images or other video content. Using (210) the stored interpretations may include utilizing neural networks, Principal Component Analysis (PCA), and/or pixel similarity.

In one specific example, if process 200 stores a group of videos in which it recognized something like "President Obama is about to start speaking," and "the President is shaking hands with the prime minister . . . ," the NLP in process 200 outputs the concept President Obama. Over time, process 200 can determine what types of images are associated with President Obama. When process 200 receives another image (still or video) of President Obama, even without speech, process 200 consults the database and determines that it is President Obama. And with speech, the reinforcing information can help increase confidence, disambiguate, and so forth.

The present invention can include one or more of the following advantages.

Speech/Natural Language Processing is used to get interpretations ("aboutness") of digital images. These digital images are used to get interpretations of other digital images, for which the system has no speech or to improve the interpretation derived from the speech.

A database of images/interpretations can help because the system can look up past interpretations in the database.

Different techniques can be used to help get the right prototype images to associate with the interpretations, including key frame in scene transitions, clustering images, and so forth.

Different techniques can be used to match images, including neural networks, Principal Component Analysis (PCA), particularly on faces, pixel similarity, and so forth.

Different techniques can be used to help with the speech/NLP including using closed captions, passages, and so forth.

Embodiments of the invention can be implemented in digital electronic circuitry, or in computer hardware, firmware, software, or in combinations of them. Embodiments of the invention can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Method steps of embodiments of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry.

It is to be understood that the foregoing description is intended to illustrate and not to limit the scope of the invention, which is defined by the scope of the appended claims. Other embodiments are within the scope of the following claims.

What is claimed is:

1. A method comprising:
  receiving a stream of video content;
  generating speech to text for the received video content;
  generating passage level annotations from the generated text using natural language processing (NLP);
  associating the passage level annotations with a timeline; and
  associating imagery with the text to generate thumbnails at periodic time intervals resulting in a database of annotations to imagery and imagery to annotations.

2. The method of claim 1 further comprising using database of annotations to imagery and imagery to annotations to obtain interpretations of other digital images to improve the interpretation derived from the speech.

3. The method of claim 1 wherein the annotations comprise names, concepts, and/or logical substructure.

4. The method of claim 1 wherein associating imagery with the annotated text to generate thumbnails at periodic time intervals comprises applying a machine learning technique.

5. The method of claim 4 wherein the machine learning technique includes one of a neural networks approach or a classification and regression tree (CART) approach to classify an image into an annotation or to classify an annotation into an image.

6. The method of claim 4 wherein the machine learning technique is a principal component analysis (PCA) of facial imagery.

7. The method of claim 4 wherein associating imagery with the annotated text to generate thumbnails at periodic time intervals further comprises clustering the images.

8. The method of claim 1 further comprising generating a master catalog of images for selected annotations.

9. The method of claim 8 further comprising comparing videos to determine whether the videos contain speech.

10. The method of claim 9 wherein comparing videos comprises pixel comparison.

11. An apparatus comprising:
a local computing system linked to a network of interconnected computer systems, the local computing system comprising a processor, a memory and a storage device;
the memory comprising an operating system and a visual similarity process, the visual similarity process comprising:
receiving a stream of video content;
generating speech to text for the received video content;
generating passage level annotations from the generated text using natural language processing (NLP);
associating the passage level annotations with the text time aligned to result in text, annotations and a time stamp; and
associating imagery with the annotated text to generate thumbnails at periodic time intervals resulting in a database of annotations to imagery and imagery to annotations.

12. The apparatus of claim 11 wherein the annotations comprise names, concepts, and/or logical substructure.

13. The apparatus of claim 11 wherein associating imagery with the annotated text to generate thumbnails at periodic time intervals comprises applying a machine learning technique.

14. The apparatus of claim 13 wherein the machine learning technique includes one of a neural networks approach or a classification and regression tree (CART) approach to classify an image into an annotation or to classify an annotation into an image.

15. The apparatus of claim 13 wherein the machine learning technique is a principal component analysis (PCA) of facial imagery.

16. The apparatus of claim 11 wherein associating imagery with the annotated text to generate thumbnails at periodic time intervals further comprises clustering the images.

17. The apparatus of claim 11 wherein the visual similarity process further comprises generating a master catalog of images for selected annotations.

18. The apparatus of claim 17 wherein the visual similarity process further comprises comparing videos to determine whether the videos contain speech.

19. The apparatus of claim 18 wherein comparing videos comprises pixel comparison.

* * * * *